July 1, 1930. G. H. WHEARY Re. 17,720

BAGGAGE CARRIER

Original Filed Dec. 17, 1924 2 Sheets-Sheet 1

Inventor:
George Henry Wheary
By Ira Milton Jones
Attorney

July 1, 1930. G. H. WHEARY Re. 17,720

BAGGAGE CARRIER

Original Filed Dec. 17, 1924 2 Sheets-Sheet 2

Inventor,

George Henry Wheary

By Sam Milton Jones

Attorney

Reissued July 1, 1930 Re. 17,720

UNITED STATES PATENT OFFICE

GEORGE HENRY WHEARY, OF RACINE, WISCONSIN, ASSIGNOR TO WHEARY TRUNK COMPANY, OF RACINE, WISCONSIN, A CORPORATION OF WISCONSIN

BAGGAGE CARRIER

Original No. 1,652,652, dated December 13, 1927, Serial No. 756,466, filed December 17, 1924. Application for reissue filed April 18, 1928. Serial No. 270,971.

This invention relates to certain new and useful improvements in baggage carriers and refers more particularly to baggage carriers of that type, comprising hingedly connected sections, one section of which has its bottom on a higher plane than that of the other.

It is an object of this invention to provide an improved and novel support for the baggage carrier section having its bottom on a higher plane.

A further object of this invention resides in the provision of an improved type of support of the character described which may be used in connection with devices other than baggage carriers.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings, I have illustrated two complete examples of the physical embodiment of my invention constructed according to the best modes I have so far devised for the practical application of the principles thereof and in which.

Figure 1:
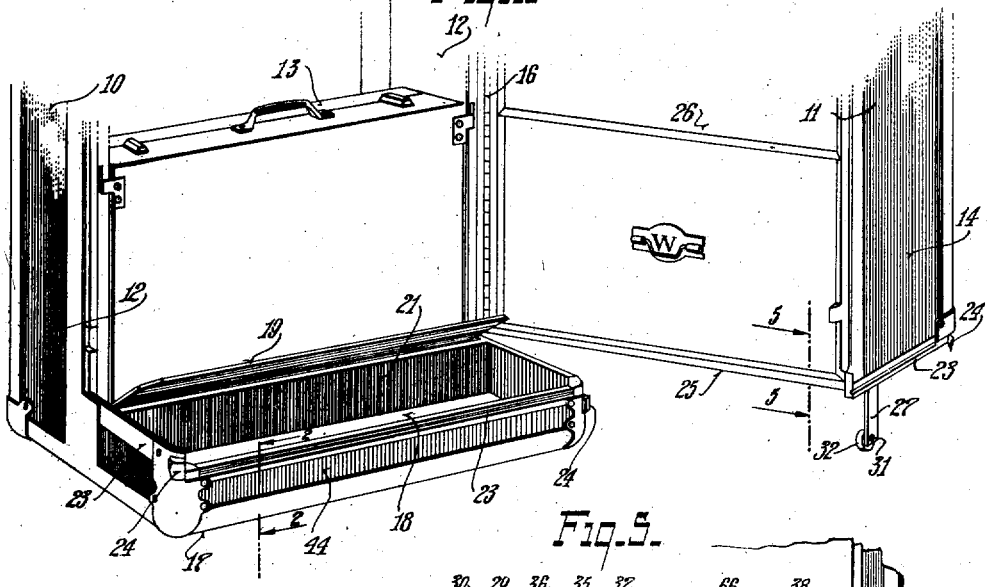
Figure 1 is a perspective view of the lower portion of a baggage carrier of the wardrobe trunk type equipped with my improved supporting means, the sections of the baggage carrier being in open position.

Referring now more particularly to the accompanying drawings, in which like numerals designate like parts throughout the several views; 10 designates the wardrobe section and 11 the drawer section of a baggage carrier of the wardrobe trunk type. The wardrobe section includes side panels 12 and a front panel 13 and the drawer section includes side panels 14 and a front panel 15, the sections being hingedly connected by a suitable hinge fitting 16 connecting the marginal edges of two adjacent side panels of the sections. The upper portions of the sections have not been illustrated in the accompanying drawings and the sections are releasably locked in closed position by any desired type of mechanism, not shown.

In further reference to a carrier as abovementioned, the bottom of one of the sections is disposed on a higher plane than the bottom of the other and is adapted to close over an extension member 17 projected from the bottom of said other section. In this embodiment, the drawer section is the one having its bottom on a higher plane, although it will be readily understood that the extension member 17 may be formed on either section and, if desired, may be provided with an interior space or compartment 18. When the space or compartment 18 is provided, a closure 19 is preferably hingedly connected, as at 20, with either a partition wall 21 separating the compartment 18 from the interior of the wardrobe section, when the extension member is carried thereby, or with the panels of the section, the free end thereof being supported on a stop 22.

As before stated, in the present illustration, the drawer section has its bottom on the higher plane and the lower marginal edges of the panels thereof are adapted to be interlocked with the panels of the extension member when the drawer section is closed thereover to resist spreading between the parts and impart a uniform exterior appearance when the sections are closed. The means connecting the meeting edges of the panels of the extension member and the section movable thereover are provided with elongated interlocking members 23 and interlocking dowel members 24 mounted at the corners.

A bottom wall 25 closes the bottom of the drawer section and the usual drawers 26 are slidably mounted therein.

While the hinge fitting 16 may be made to support the entire weight of the drawer section when in open position, it is desirable to provide means supporting the outer free end thereof to relieve the hinge fitting of a portion of the weight and consequently prevent the placing of undue strains on the side panels of the sections such as would occur when the drawer section is heavily packed. To this end I provide the supporting leg structure illustrated in the accompanying drawings which is designed to automatically collapse and be concealed when the movable section is closed and to automatically extend to operative position as the movable section opens. Two modified forms of supporting legs are illustrated in the accompanying drawings and attention is now directed to Figures 1 to 4, inclusive, depicting the preferred embodiment.

The supporting leg proper, designated by the reference character 27, is secured to a plate 28, by a pivot pin 29, which is fixed to the outer panel 14 of the movable section adjacent the inner lower marginal edge thereof by rivets or other fastening means 29′. The bottom wall 25 of the movable section is slotted or cut-away, as at 30, to accommodate the plate 28 and permit movement of the leg thereinto when the sections are closed, as illustrated in Figure 2.

The outer free end of the leg 27 carries a stub shaft 31 on which a floor engaging roller 32 provided with a suitable rubber tread 33 is journaled by a roller or ball bearing 34. The inner end of the leg is extended beyond the pivot 29 and provided with a locking lug or latch element 35 which is engageable in a locking or latch recess 36 formed in the outer free end portion of a keeper or locking lever 37 when the leg is in a vertical or active position.

The lever 37 has its inner end pivotally fixed to the plate 28, adjacent the inner upper corner thereof by a pivot 38, the movement of its free end being defined by the limits of an arcuate slot 39 struck from an arc employing the pivot 38 as a center and in which works a stud or stop 40 fixed to the outer upper corner portion of the plate. The lever 37 is normally in an approximately horizontal position by gravity and when in such position a latch trip 41 secured thereto medially of the locking recess 36 and the pivot 38 by rivets or other means 42 has its lower inclined or cam shaped end 43 extended below the plane of the edge of the front panel 44 of the extension member. The trip 41 rides over the extension member front panel in the opening and closing movements of the movable section, raising the outer free end of the locking lever 37 within the limits of the slot 39 to free the locking recess 36 of the locking lug 35.

Figure 2:
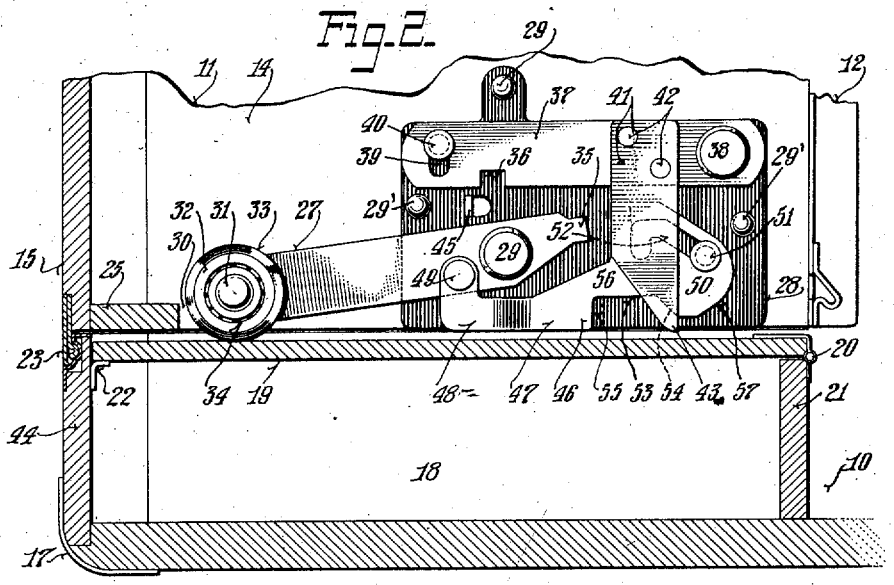
Figure 2 is an enlarged, fragmentary view taken through the lower portion of the section mounting the supporting means on the plane of line 2—2 of Figure 1, the supporting means being in collapsed position.

As best illustrated in Figure 2, the leg 27 is folded or collapsed within the recess 30 with the roller 32 engaging the closure 19, when the sections are closed and the locking lever 37 is in its horizontal position. As the movable section is swung to open position, the roller 32 tracks over the closure 19 and rides over the upper edge of the extension member front panel, the outer end of the leg dropping of its own weight substantially simultaneously with the lifting of the free end of the lever 37 by the trip latch 41 riding over the front panel 44. The locking lever being out of the path of the leg locking lug 35, frees the leg of any frictional restriction to its movement to its vertical operative position defined by a stop 45 carried by the plate 28, and the lever drops to its locking position as the trip passes off the front panel 44, engaging the locking lug in the recess 36, providing the leg has moved to its dotted position in Figure 3. The leg is thus rigidly secured in its operative position by the locking lever to provide a sturdy support for the outer free end of the movable section while in open position, the lower-most portion of the roller 32 being at all times on an even plane with the bottom of the normally stationary section.

Figure 3:
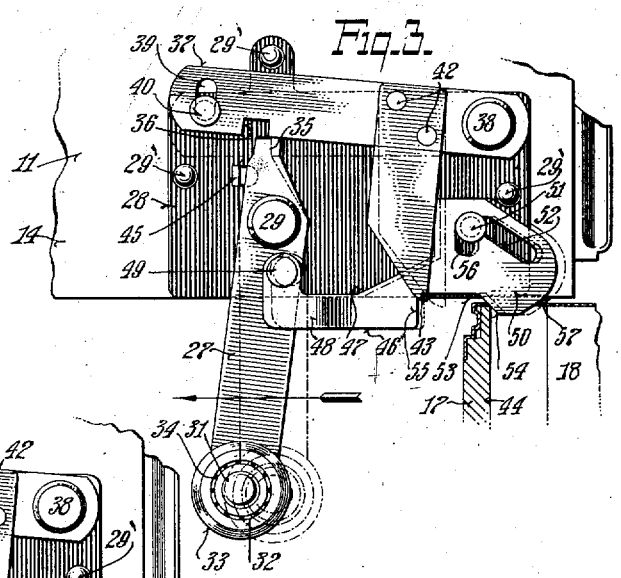
Figure 3 is a fragmentary view taken through the front panel of the extension member adjacent the outer panel of the movable section with the movable section in partly opened position.

In the event the leg 27 fails to move by its weight to the dotted line position illustrated in Figure 3, with its locking lug 35 in line to be engaged in the locking recess 36, a trunk controlled leg actuating member 46 is provided having a horizontal arm portion 47, the outer end 48 of which is offset and directed upwardly and pivotally secured to the leg a short distance from the pivot 29 by a pivot 49. The other end portion 50 of the member 46 is of the irregular shape illustrated in Figures 2 to 4 and is secured to the plate 28 by a stud 51 carried thereby and passed through a cam opening or slot 52 in the end 50 of the member. The arm portion 47 of said member is defined and separated from the end portion 50 by a recess or notch 53 and the lower surface of the arm portion extends beyond the plane of the lower surface of the end 50, the wall or shoulder 54 defining the end of the recess or notch 53 adjacent the end 50 being inclined to form a cam surface, for the reasons to be later described, and the wall 55 defining the other end thereof being abrupt for the purpose later described.

The cam slot 52 is inclined inwardly and upwardly from the outer end of the portion 50 so that with the leg 27 in vertical position the stud 51 is at the inner upper end thereof. As the movable section is opened to the point where the end 55 of the arm 47 passes beyond the front panel 44 of the extension member the leg drops as hereinabove described, the lower surface of the arm 47 being held on a plane above that of the edge of panel 44 by the pivot 49 and the stud 51 in the manner illustrated in Figure 3. The lower edge of the end portion 50 of the actuating member 46 while on a higher plane than the lower edge of the arm 47 extends below the plane of the upper edge of the extension member front panel when the leg is in any position approaching vertical and as a result the cam or inclined wall 54 of the recess strikes the upper edge of the front panel 44 moving the actuating member 46 to the right with reference to Figure 3, if the leg had not been moved to its operative position by its weight as above described. The movement of the member 46 by its engagement with the front panel is limited by the stud 51 reaching the extreme upper end of the cam slot 52, when the cam wall 54 rides over the front panel raising the member 46, the stud 51 passing into a vertical slot 56 communicating with the extreme inner upper end of the cam slot 52, the actuating member dropping as it frees the extension member to its dotted position illustrated in Figure 3. This construction provides mechanical means for positively assuring the locking of the leg in operative position on each opening of the sections.

The leg being thus secured in operative position, the movable section may be freely swung full open, the outer free end thereof being supported by the leg 27 relieving the hinge fitting 16 and the section side panels of undue strain, the supporting leg providing a support for the outer free end of the movable section at any point from full open to a partially closed position.

Figure 4:
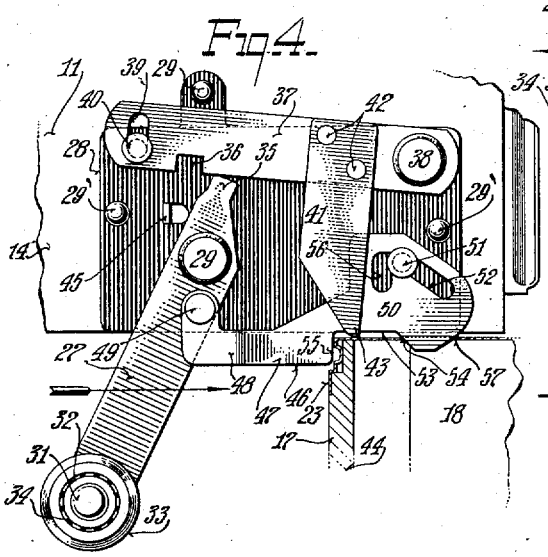
Figure 4 is a fragmentary view similar to Figure 3 illustrating the approach of the movable section to closed position.

As the movable section is closed, the extreme outer curved edge 57 of the end 50 of the trunk controlled actuating member rides over the upper edge of the extension member front panel, the stud 51 passing into the vertical portion 56 of the cam recess, and then drops back to its dotted position illustrated in Figure 3. Continued closing movement of the section engages the end 43 of the trip 41 with the upper portion of the extension member front panel raising the free end of the latch lever 37 and disengaging the locking recess 36 and the locking lug 35 with the latch member still in raised position, the inner end 55 of arm 47 strikes the front panel 44, as illustrated in Figure 4, moving the trunk actuating member to the left with reference to Figure 4 swinging leg 27 on its pivot in a clockwise direction to its folded or collapsed position. Folding of the supporting leg bodily raises the member 46 by reason of the shifting of its pivot 49 and the movement of the stud 51 into the lower end of the slot 52 until it frees the top of the panel 44, see Figure 2, the latch lever dropping to its normal position as the trip frees the front panel.

Figure 5:
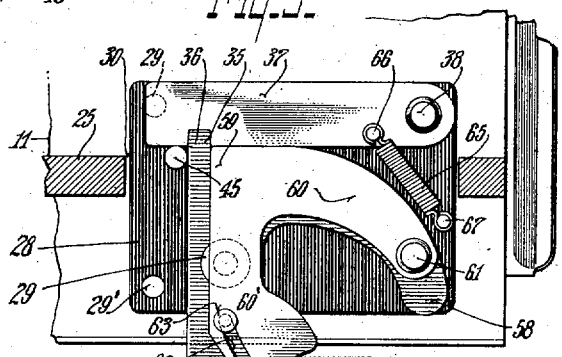
Figure 5 is a view taken on the plane of the line 5—5 of Figure 1 and illustrating a slightly modified construction of supporting leg.
Figure 6:
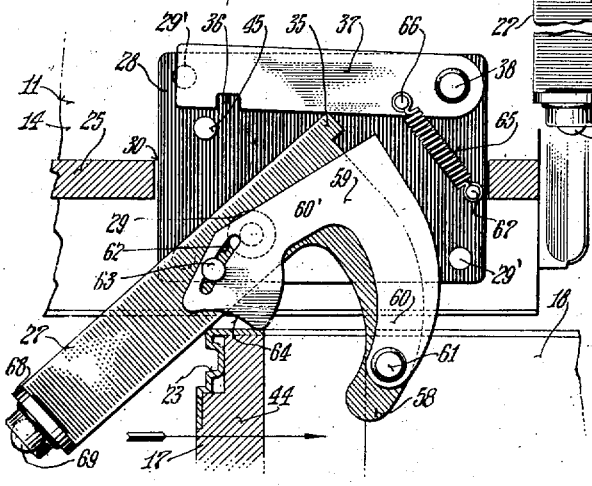
Figure 6 is a view of that form of supporting means illustrated in Figure 5 illustrating the supporting leg in the act of folding or collapsing as the movable section is closed.

In Figures 5 and 6, a slightly modified form of collapsible or foldable supporting means is illustrated in which the trunk controlled actuating member is eliminated and in its place the leg is provided with an arcuate arm or lever 58 which lies within the path of the extension member front panel when the leg is collapser. Opening movement of the movable section engages the outer end of the arcuate arm with the inner face of the front panel, swinging the leg on its pivot toward vertical position. The latch member 41 is also replaced by a trip element 59 approximately V shape with one arm 60 thereof of arcuate shape to conform with that of the lever or arm 58 of the supporting leg to which it is pivotally secured, as at 61. The other arm 60′ of the trip is secured to the leg proper to permit its movement on the pivot 61 within the limits defined by the ends of an arcuate slot 62 in the outer end portion of the arm 60′ and struck on an arc with the pivot 61 as a center, a leg carried stud or pin 63 being passed through said slot. The outer end portion of the trip arm 60′ has a cam 64 formed thereon adapted to be in the path of the upper edge of the front panel 44 when the supporting leg is in operative position to move the trip on its pivot 61 and raise lever 37 to free the locking lug of the locking recess 36. As will be evident lever 37 is of a thickness to extend beyond the face of the supporting leg to permit its engagement by the trip 59.

If desired a contractile spring 65 may be employed to yieldably hold lever 37 in locking position, the spring having one end connected with the lever 37, as at 66, and its other end connected with the plate 28, as at 67. In place of the roller 32, the lower end 68 of the leg may be directed laterally and provided with a suitable ball or other floor engaging means 69.

From the foregoing description, taken in connection with the accompanying drawings, it will be readily obvious to those skilled in the art to which an invention of this character appertains that I provide an improved supporting means especially adapted for baggage carriers, although it may be used in connection with any other device wherein a collapsible or disappearing supporting structure is desired.

What I claim as my invention is:

1. A collapsible support for a trunk of the class described, comprising a carrying member, a supporting leg collapsibly mounted on the carrying member, a locking lever, cooperating means carried by the supporting leg and lever to lock the leg in operative position, and trunk operated means operable to break the locking connection between the lever and leg to permit collapsing of the leg.

2. In a trunk of the character described having a compartment member and a section movable thereover to closed position, a supporting structure for the section when in open position and comprising a floor engaging member, means connecting the floor engaging member with the movable section for movement to and from an active position, means operable to lock the floor engaging member in active position when the movable section is moved to open position, and means operable by the closing movement of the section to release the member locking means.

3. In a trunk of the character described having a compartment member and a section movable thereover to closed position, a supporting structure for the section when in open position and comprising a floor engaging member, means connecting the floor engaging member with the movable section for movement to and from an active position, means operable to lock the floor engaging member in active position when the movable section is moved to open position, and means operable by the closing movement to said section to release the member locking means and swing the floor engaging member to collapsed position.

4. A collapsible support of the character described, comprising a carrying member, a supporting leg collapsibly mounted on the carrying member, a locking lever, cooperating means carried by the supporting leg and lever to lock the leg in operative position, means for automatically moving the leg to locked position, and means limiting the movement of the leg to operative position.

5. In a trunk of the character described including a movable section, a supporting leg, means pivotally mounting the supporting leg on the section, a lever pivotally carried by the section, a releasable interlocking connection between the lever and the inner end of the supporting leg when the supporting leg is in operative position, and means operable upon movement of the section to break the interlocking connection between the lever and leg.

6. In a trunk of the character described, having a movable section, a supporting leg, means pivotally mounting the supporting leg on the section whereby the same may move to operative position of its own weight, and means for automatically moving the leg to full operative position in the event the same fails to move to such position of its own weight.

7. In a trunk of the character described, the combination with a stationary member and a second member movable thereover, of a supporting structure for the second member comprising a floor engaging member, means mounting the floor engaging member for movement to and from concealed and active positions, an element connected with the floor engaging member and adapted to lie in the path of a part carried by the stationary member whereby movement of the second member to open position causes said element to swing the leg to active position, and means for releasably locking the leg in active position.

8. In a device of the character described, the combination with a stationary member and a second member movable thereover, of a supporting structure for the second member comprising a floor engaging member, means mounting the floor engaging member for movement to and from concealed and active positions, an element connected with the floor engaging member and adapted to lie in the path of a part carried by the stationary member whereby movement of the second member to open position causes said element to swing the floor engaging member to active position, means for releasably locking the floor engaging member in active position, and releasing means for the locking means and operable upon closing of the movable member over the stationary member.

9. A wardrobe trunk having a section movable about an upright axis and having the bottom of said section above the bottom of the trunk, and a support carried by the section for cooperating with the supporting surface on which the trunk rests to one side of the trunk when said section is in open position, and automatically acting means for effecting a movement of the support toward supporting position upon the movement of the swinging section toward open position.

10. A wardrobe trunk having a section movable about an upright axis with a bottom spaced from the bottom of the trunk, a support for supporting the section in open position, and automatically acting means for effecting the movement of the support to folded position upon the movement of the swinging section towards closed position.

11. A wardrobe trunk having a section mounted to swing about an upright axis and having its bottom spaced from the bottom of the trunk, a support for supporting the section in open position, and automatically acting means for effecting the movement of the support to supporting position as the section is being opened, and away from supporting position as the section is being closed.

12. A baggage carrier, comprising two hingedly connected sections of different heights, the shorter section having its bottom disposed on a higher plane than the bottom of the higher section, a compartment of a depth substantially equal to the distance the bottom of the shorter section is spaced from the bottom of the higher section and extended from the bottom of the higher section and over which the shorter section is movable to closed position, access being had to the interior of the compartment through the top thereof when the sections are open, a closure for the top of the compartment, a supporting leg pivotally carried by the shorter section adjacent its outer free end, said leg dragging over the upper edge of the compartment when the sections are closed and being moved thereby into a concealed position between the compartment closure and said shorter section, said leg dropping to an operable position as the shorter section is swung open to free the same of the compartment, and means preventing movement of the leg member beyond its operative position by the continued opening movement of the shorter section after the leg member has dropped, but permitting collapsing thereof as the shorter section is moved to closed position.

13. A trunk, comprising a pair of hingedly connected sections, a member projected laterally from the bottom of one section and over which the other section is movable to closed position, access being had to the interior of said member from the top when the sections are opened, a closure for the open top of said member, movable means carried by the movable section for supporting the same when in an opened position, and said means adapted to rest upon said closure when the sections are closed.

14. A baggage carrier, comprising two hingedly connected sections of different heights, the shorter section having its bottom disposed on a higher plane than the bottom of the higher section, a compartment of a depth substantially equal to the distance the bottom of the shorter section is spaced from the bottom of the higher section and over which the shorter section is movable to closed position, access being had to the interior of the compartment through the top thereof when the trunk sections are open, a closure for the top of the compartment, and a supporting leg pivotally carried by the shorter section adjacent its outer free end, said leg dragging over the upper edge of the compartment when the sections are closed and being moved thereby into a concealed position between the compartment closure and said shorter section.

In testimony whereof I have hereunto affixed my signature.

GEORGE HENRY WHEARY.